United States Patent Office 3,322,854
Patented May 30, 1967

3,322,854
METHOD OF MIXING POLYSTYRENE WITH LINEAR POLYESTERS
Takeshi Yasui, Takaakira Tsuji, and Osamu Fukushima, Kurashiki, Japan, assignors to Kurashiki Rayon Company Limited, Kurashiki, Japan, a corporation of Japan
No Drawing. Filed Mar. 30, 1964, Ser. No. 355,939
Claims priority, application Japan, Apr. 6, 1963, 38/18,393
5 Claims. (Cl. 260—873)

This invention relates to manufacturing fibers or shaped articles made from polycondensates comprising polyesters or mainly comprising polyesters (A-substances) and polymers of aromatic vinyl compounds or copolymers mainly composed of aromatic vinyl compounds (B-substances), by mixing A-substances with B-substances before polycondensation or in the course of polycondensation of A-substances and completing the polycondensation or copolycondensation thereafter, with the aim to obtain mixed polymer substances in which both or several polymers are mixed almost perfectly and homogeneously and to improve moldability, resistance to pilling that has been regarded as a defect of polyethylene terephthalate fibers containing no other substances, resistance to wrinkle, and improved dyeability.

Recently great progress has been made and additional progress can be expected in the field of manufacturing various shaped articles by so-called polymer blending, that is, by mixing two or more polymer substances to obtain products of improved characteristics. The inventors have been studying polymer blending extensively and found that the different polymers can not be always mixed nor shaped, but that only few different polymers can be blended and be used for the new development in this field.

Thus after studying various polycondensations in the presence of various mixed low molecular weight substances in order to manufacture mixed polymer substances, the inventors found that mixed polymer substances of this invention produced by mixing B-substances or low molecular weight compounds of B-substances before or in the course of polycondensation of A-substances and by accomplishing polycondensation or copolycondensation thereafter, are very good in compatibility and so these shaped articles are much more homogeneous than those obtained by mixing A-substances with B-substances after polymerization. It was also found that the mixed fibers produced from the mixed melts of A-substances and B-substances manufactured by this invention have very good spinnability, drawability and moreover show good resistance to pilling and wrinkle and excellent dyeability.

If B-substances are added in the process of synthesizing A-substances, they may be added before polycondensation of A-substances or in the course of polycondensation, but if B-substances and copolymer or mixtures of B-substances are added, they are preferably added before polycondensation of A-substances. The process of this invention is very characteristic in the point that the process of polycondensation of A-substances is carried out in the same way as the known polycondensation process of polyesters even if B-substances are added.

The quantity of B-substances, or mixtures of B-substances to be added is 2–65% based on the weight of A-substances, but preferably 10–45%.

For instance, dimethyl terephthalate, ethylene glycol and, as catalysts, zinc acetate and antimony oxide are measured in certain definite ratios and ester interchange reaction are carried out by heating these raw materials at 170–190° C. for 3 hours and at 240–250° C. for ½ hour with introduction of nitrogen. Polystyrene with the intrinsic viscosity of 0.75 dl./g. measured in benzene at 30° C. is added in the amount of 40% based on the weight of dimethyl terephthalate, and then polycondensation is carried out by heating at 260–280° C. for ½ hour under the reduced pressure of 20–30 mm. Hg with stirring, and at 280° C. for 6 hours under the reduced pressure of lower than 1 mm. Hg. The mixed polymer substance thus obtained is melt spun in a usual way and the spun fiber is drawn four times in an air oven at 110° C., and then drawn once more in an air oven at 140° C. to the extent that the total ratio of drawing is 4.7 times. The fiber thus obtained has properties shown in the Table 1. And the properties of the fiber made from polyethylene terephthalate containing no other substance are shown in the same table for comparison.

TABLE 1
A—Fibers of this invention
B—Fibers of polyethyleneterephthalate

| Sample | Denier | Tenacity (g./d.) | | Elongation (percent) | | Young's Modulus (g./d.) | | Shrinkage (percent) in water at 100° C., 30 min. | Temperature (° C.) at 10% shrinkage in air oven | Dye on fiber, mg./g.* |
|---|---|---|---|---|---|---|---|---|---|---|
| | | Dry | Wet | Dry | Wet | Dry | Wet | | | |
| A | 3.2 | 3.8 | 3.8 | 23.0 | 24.0 | 65 | 65 | 0.7 | 232 | 9.2 |
| B | 2.9 | 4.2 | 4.2 | 26.0 | 25.1 | 60 | 60 | 0.9 | 231 | 6.9 |

*Dyeing Condition: Dye, Duranol Violet 2R, 2%; Scourol 400, 10%; 98° C., 2 hours, 50:1.

The fiber of this invention is manufactured by coknead-ing chips of A-substances and B-substances before spinning. In contrast to a fiber obtained from mixing preformed polymers of the above substances, which fiber is not satisfactorily stretched; the fiber of this invention is easily stretched without becoming opaque.

The process of stretching the undrawn fiber can be preformed by one-stage or multi-stages in the temperature range of about 70–170° C. and it is also possible to draw the heat-set fiber.

Besides heat-setting can be done in the temperature range of 90–160° C.

The bath to be used for stretching or heat-setting the fiber are air bath, non active gas bath, hot water bath and the like various baths. Furthermore the bath containing the swelling agent against B-substances may be used.

To improve the dyeability or to prevent the electrification of the fiber of the invention, the third materials may be added, moreover the stabilizer, color preventing compounds, plasticizer, dye, paint and the like may also be mixed.

A-substances to be used for the invention are polyesters or copolycondensated polyesters of various dibasic acids or esters thereof and various glycols. As the copolycondensates mainly consisting of polyesters, those which comprising ether bond, amide bond, urethane bond and urea bond besides ester bond may be used.

It is desirable that the melting point of all these polycondensates or copolycondensates lies between 160° C. and 300° C.

For example, the adequate polyesters are as follows:

Polyesters obtained from terephthalic acid or ester thereof and ethylene glycol, copolycondensate polyester obtained from terephthalic acid or ester thereof and isophthalic acid or ester thereof and ethylene glycol, polyester obtained from terephthalic acid or ester thereof and cyclohexane-1-4-dimethanol, polyester obtained from p-β-hydroxybenzoic acid and so on.

Typical monomers which may be employed to form the B-substances include styrene, α-methylstyrene, p-methoxystyrene, vinyltoluene, styrene chloride, styrene dichloride, acenaphthylene or sulfonated compounds thereof and the like may be used.

As B-substances there may also be employed copolymers which copolymerize at least one compound selected from the group consisting of vinyl chloride, acrylonitrile, ethylene, propylene and the like with above described materials.

*Example 1*

For preparing polyester the raw materials which contain dimethyl terephthalate 150 g., ethylene glycol 150 g. and as catalyst zinc acetate 0.05% and antimony oxide 0.025% by weight based on dimethyl terephthalate were heated at 170–190° C. for 3 hours and conducting nitrogen stream, heating is continued, rising the temperature up to 240–250° C. for ½ hour to finish ester exchange reaction. Then 40%, based on the base of dimethyl terepthalate, of polystyrene which shows 0.75 dl./g. of intrinsic viscosity, here intrinsic viscosity was measured at 30° C. in benzene, was added. Reducing the pressure to 20–30 mm. Hg, the mixture was heated at 260–280° C. for ½ hour. Moreover polycondensation was carried out reducing the pressure lower than 1 mm. Hg while the temperature was maintained at 280° C. for 6 hours.

The mixed polymer thus obtained shows 0.58 dl./g. of intrinsic viscosity. Here intrinsic viscosity was determined in a solvent which was a mixture of 50:50 phenol and tetrachloroethane at 30° C.

Resultant mixed polymer was extruded to the spinning chimney through a spinneret which has ten holes and each hole has 0.25 mm. diameter.

The temperature of the spinneret was preserved at 275° C. Extrusion speed was 2 g./min. and wind-up speed was 120 m./min. The filament thus manufactured was drawn to four times in an air bath at 110° C., continuously the drawn filament was stretched to 4.7 times to its original length.

The property of the said filament was summarized in Table 1.

*Example 2*

Dimethyl terephthalate 150 g., ethylene glycol 150 g., 40% of styrene monomer based on the weight of dimethyl terephthalate and same quantity of the catalyst as Example 1 were reacted as Example 1 to finish ester exchange and polymerization reaction.

The mixed polymer thus obtained shows 0.57 dl./g. of intrinsic viscosity.

This mixed polymer was spun in the same manner as Example 1, and the fiber was stretched to 3.5 times at 95° C. in a polyethylene glycol bath, continuously the fiber was stretched to 4.5 times in an air bath at 150° C. to its original length. The resultant fiber showed dry tenacity 4.1 g./d., dry elongation 26%.

*Example 3*

As the raw materials, dimethyl terephthalate 150 g., ethylene glycol 150 g. and 0.20 mole percent of pentaerythritol, 0.10 mole percent of methoxypolyethylene glycol based on the dimethyl terephthalate were used and after finishing the ester exchange reaction, the polystyrene which polymerization degree is about 2,500 was added, then polycondensation was performed under the same conditions as Example 1. The mixed polymer manufactured has 0.54 dl./g. of intrinsic viscosity.

This mixed polymer was spun as Example 1, and the fibre was drawn to 3.8 times in water at 90° C., moreover to 4.6 times in an air bath at 140° C.

The resultant fibre was dyed clear with disperse dye.

What we claim is:

1. A method of manufacturing resin blend compositions comprised of an A-condensate consisting essentially of a saturated linear fiber forming polyester selected from the group consisting of polyesters obtained from terephthalic acid or esters thereof and ethylene glycol, copolyesters obtained from terephthalic acid or esters thereof, isophthalic acid or esters thereof and ethylene glycol, copolyesters obtained from terephthalic acid or esters thereof and cyclohexane-1,4-dimethanol, and polyesters obtained from p-β-hydroxybenzoic acid; and a B-substance selected from the group consisting of monomers of styrene, α-methylstyrene, p-methoxystyrene, vinyltoluene, styrene chloride, styrene dichloride, acenaphthylene, and homopolymers thereof; comprising adding the B-substance to the A-condensate prior to the completion of polycondensation of said A-condensate, and thereafter completing said polycondensation.

2. A method according to claim 1 wherein B-substance is added as a polymer.

3. A method according to claim 1 wherein B-substance is added in monomeric form.

4. A method according to claim 1, wherein about 2 to 65% B-substance is present in the blend based on the weight of A-condensate, and the remainder of said blend consists essentially of A-condensate.

5. A method for preparing a resin blend composition which consists essentially of a homogeneous blend of polyethylene terephthalate and polystyrene, which comprises adding said polystyrene prior to completion of polycondensation of said polyethylene terephthalate, and completing the polycondensation thereafter.

References Cited

UNITED STATES PATENTS

| | | | |
|---|---|---|---|
| 2,882,255 | 4/1959 | Caldwell et al. | 260—873 |
| 2,996,475 | 8/1961 | Joyner et al. | 260—873 |

FOREIGN PATENTS

| | | |
|---|---|---|
| 854,475 | 11/1960 | Great Britain. |
| 876,001 | 8/1961 | Great Britain. |

MURRAY TILLMAN, *Primary Examiner.*

J. T. GOOLKASIAN, *Assistant Examiner.*